US006862461B2

(12) United States Patent
Gawne

(10) Patent No.: US 6,862,461 B2
(45) Date of Patent: *Mar. 1, 2005

(54) METHODS AND APPARATUS FOR WIRELESS OPERATOR NOTIFICATION IN DOCUMENT PROCESSING SYSTEMS

(75) Inventor: Kevin D. Gawne, Waterloo (CA)

(73) Assignee: NCR Corporation, Dayton, OH (US)

( * ) Notice: Subject to any disclaimer, the term of this patent is extended or adjusted under 35 U.S.C. 154(b) by 441 days.

This patent is subject to a terminal disclaimer.

(21) Appl. No.: 09/848,002

(22) Filed: May 3, 2001

(65) Prior Publication Data

US 2002/0165007 A1 Nov. 7, 2002

(51) Int. Cl.[7] .............................................. G06F 17/00
(52) U.S. Cl. ................... 455/557; 423/66.1; 423/67.11; 423/566; 709/227; 707/500; 382/137
(58) Field of Search ............................. 455/67.11, 67.7, 455/423, 425, 556.1, 226.1, 45, 557, 66.1, 405–406, 414; 399/8, 81; 709/217, 227; 70/566; 707/500; 715/500; 382/137

(56) References Cited

U.S. PATENT DOCUMENTS

| 5,185,866 A | * | 2/1993 | Francisco .................... 710/100 |
| 5,218,356 A | * | 6/1993 | Knapp ......................... 342/350 |
| 5,309,351 A | | 5/1994 | McCain et al. |
| 5,758,300 A | | 5/1998 | Abe |
| 5,774,759 A | * | 6/1998 | Tanaka ........................... 399/8 |
| 6,089,456 A | * | 7/2000 | Walsh et al. ............ 235/472.01 |
| 6,144,997 A | * | 11/2000 | Lamming et al. ............ 709/217 |
| 6,184,841 B1 | * | 2/2001 | Shober et al. ............... 343/853 |
| RE37,258 E | * | 7/2001 | Patel et al. ................. 358/1.15 |
| 6,520,498 B2 | * | 2/2003 | Phinney ....................... 271/263 |
| 6,585,775 B1 | * | 7/2003 | Cosentino et al. .......... 715/500 |
| 2002/0165968 A1 | * | 11/2002 | Cosentino .................... 709/227 |

FOREIGN PATENT DOCUMENTS

EP 0 377 330 7/1990

* cited by examiner

*Primary Examiner*—David Hudspeth
*Assistant Examiner*—Kamran Afshar
(74) *Attorney, Agent, or Firm*—Priest & Goldstein PLLC

(57) ABSTRACT

Techniques for operator notification of exceptions affecting financial document transaction processing machines are described. A transaction processing machine affected by an exception notifies the operator by sending a wireless message by means of a low cost, wearable operator display unit, which then displays the message using a display screen such as an LCD screen. Upon receiving the message, the operator clears the exception and directs the operator display unit to signal the processing machine that the exception has been cleared. Upon receiving the signal, the document processing machine checks for other exceptions and either resumes operation or performs further exception handling depending on whether further exceptions exist.

17 Claims, 8 Drawing Sheets

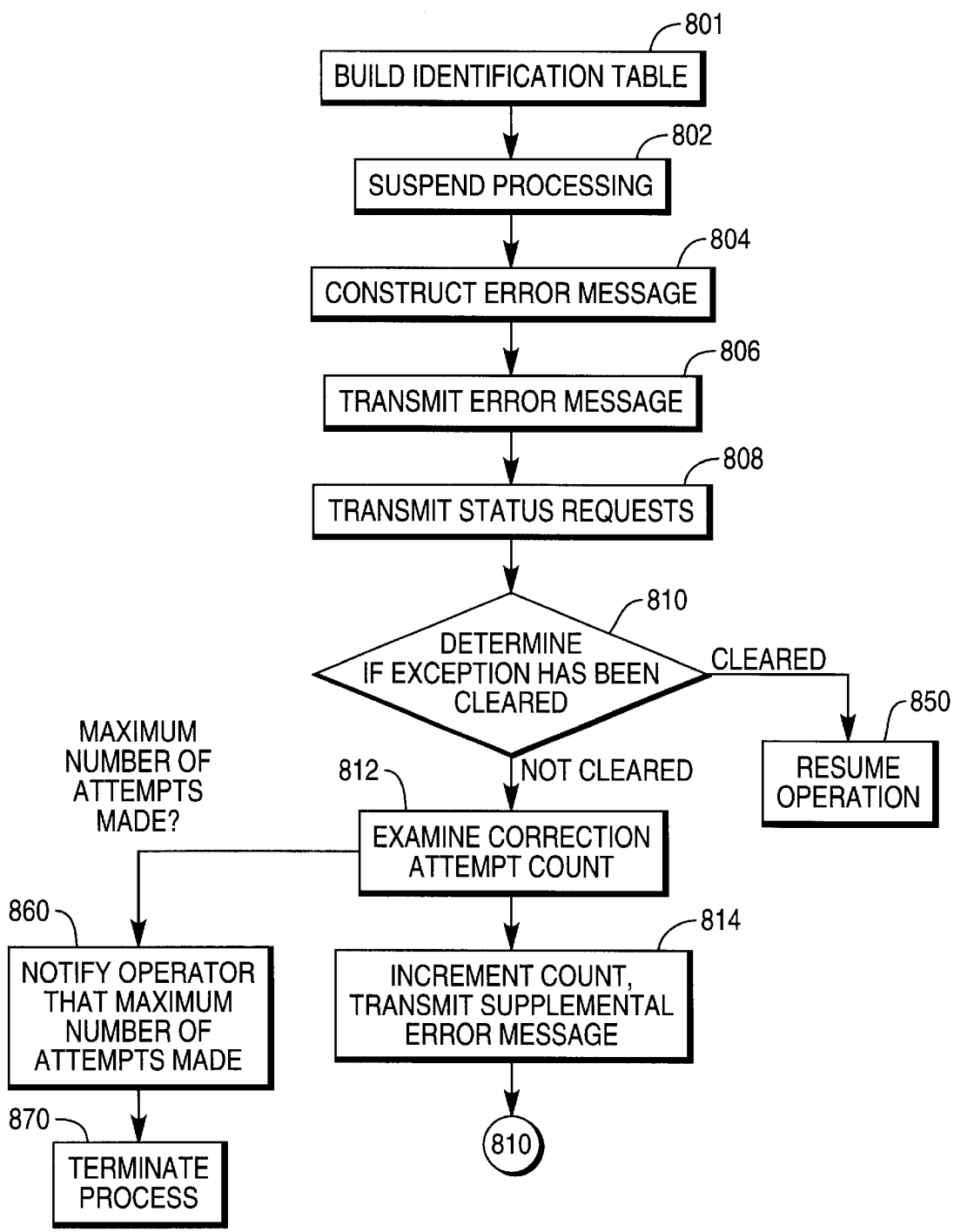

METHODS AND APPARATUS FOR WIRELESS OPERATOR NOTIFICATION IN DOCUMENT PROCESSING SYSTEMS

The related applications entitled "Methods and Apparatus for Wireless Operator Remote Control in Document Processing Systems", U.S. patent application Ser. No. 09/848,005, still pending, and "Methods and Apparatus for Wireless Display Units for Document Trays in Financial Document Processing", U.S. patent application Ser. No. 09/848,004, still pending, filed on even date herewith and assigned to the assignee of the present invention, address related subject matter and are incorporated herein by reference in their entirety.

FIELD OF THE INVENTION

The present invention relates generally to financial document transport and processing systems. More particularly, the invention relates to an improved document processing system and methods employing a small, low cost wireless display unit which can be worn or carried by an operator in order to receive messages notifying the operator of a need for intervention.

BACKGROUND OF THE INVENTION

An item transport, used in financial document processing systems to receive, process and sort documents, typically comprises an input section in which a batch of documents is placed for processing, a transport path for transporting the documents through various processing steps, a sorting area where the documents are sorted into different pockets after processing, and display and input sections where an operator is able to read displayed messages and enter information and commands. An operator is frequently called on to perform tasks at different areas of the transport. A typical item transport is quite large and requires an operator to walk a significant distance to get from one side or end of the transport to the other. For example, an operator may be working at the sorting area of the transport when a problem occurs, causing the transport to interrupt processing and display an error message. The operator must walk to the display area, read the error message and then proceed back to the sorting area or to another identified area in order to correct the problem. The need for the operator to walk back and forth along the transport to receive messages and then perform tasks related to those messages interferes with operator efficiency.

SUMMARY OF THE INVENTION

The present invention recognizes that there is a need for a system to provide instructions to an operator of a document processing system, which may advantageously employ a low cost, rugged wireless display unit with relatively low power usage, able to receive transmissions anywhere in the vicinity of a processing machine without requiring a line of sight transmission.

Among its several aspects, such a system advantageously allows an operator to be notified of problems and their locations wherever he or she happens to be with respect to the transport. Ideally, the methods used for notification will not interfere with the operator's freedom of movement and may advantageously be accomplished using a low cost device in order to minimize expense and to insure that breakage or loss of devices would not cause undue hardship. The devices used will also advantageously minimize battery drain in order to allow the operator to work without being interrupted by a need to replace batteries.

A document processing system according to one aspect of the present invention may suitably include an item transport controlled by a transport controller which may suitably be a personal computer (PC). The transport controller communicates with a user interface for displaying operator messages and receiving operator inputs. The user interface may suitably include a monitor for displaying messages and a keyboard to allow operator inputs. The transport controller also communicates with a transmitter interface for sending messages to and receiving commands or other operator inputs from each of a plurality of wireless operator display units which may be carried or worn by the operators. The operator display units are preferably inexpensive and rugged, and may suitably be implemented through the appropriate adaptation of electronic shelf labels such as are presently used in retail stores to receive and display price information. Each of the operator display units has a unique address so that a message directed toward a particular unit includes the unit address and the message, so that only the intended unit will display the message. This ability is important where multiple units are employed in the same processing environment as may occur in major check or credit processing operations. Each of the operator display units is preferably adapted to allow the operator to transmit messages back to the transport controller through the use of pushbuttons or other simple interface devices. When an exception occurs affecting an item transport, the transport controller suspends item processing, displays a message using the monitor and also transmits an abbreviated message to an operator display unit associated with the affected transport. The message may be sent directly or by means of a server controlling access to a transmitter interface shared by a number of different transports, the transports being connected to the server by means of a local area network. Upon sending the operator display message, the transport controller begins transmitting status messages to the operator display unit. Once the operator has cleared the exception, he or she directs the operator display unit to signal the transport controller that the exception has been cleared, typically by pressing a pushbutton on the operator display unit. It is also possible to signal that the exception has been cleared by pressing a button on the transport pocket or by pressing a key on a keyboard providing an interface to the transport controller. Once the operator has pressed the pushbutton or otherwise signaled that the exception has been cleared, the operator display unit responds to a status request by signaling the transport processor that the exception has been cleared. The transport processor then performs another check for exceptions, and either resumes processing or performs further exception handling depending on whether exceptions exist.

A more complete understanding of the present invention, as well as further features and advantages of the invention, will be apparent from the following Detailed Description and the accompanying drawings.

BRIEF DESCRIPTION OF THE DRAWINGS

FIG. 8 illustrates a process of transport exception handling according to the present invention.

DETAILED DESCRIPTION

Figure 1:
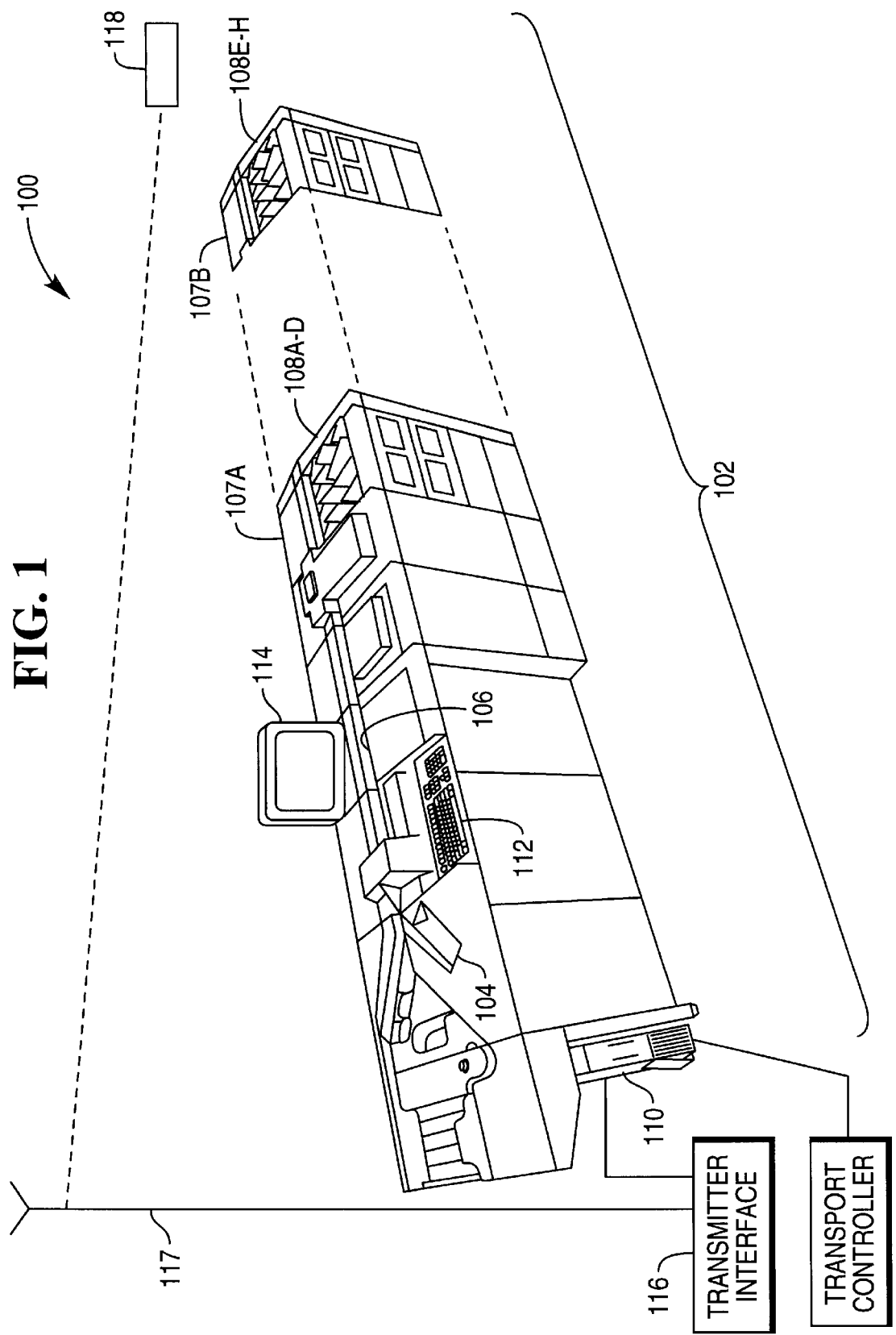
FIG. 1 illustrates a document processing system according to the present invention.

FIG. 1 illustrates a document processing system 100 according to the present invention. The system 100 includes an item processing transport 102 for processing and sorting documents. The transport 102 includes a hopper 104, a transport path 106 and sorting pocket modules 107A and 107B. The sorting pocket module 107A includes sorting pockets 108A–108D and the sorting pocket module 107B includes sorting pockets 108E–108H. The sorting pocket modules 107A and 107B are physically distinct units of machinery, each containing four pockets, but in document processing operations the pockets 108A–108H are grouped according to the needs of the processing operation being performed. For example, a particular operation may use the pockets 108A–108D as a set of pockets for grouping of documents, while another operation at a later stage of processing may use the set of pockets 108A–108B, while still another operation uses the pockets 108A–108H. It will be recognized that the number of sorting pocket modules which may be used is not limited to the two represented by the modules 107A and 107B. Instead, the transport 102 may include as many sorting pocket modules as are needed. For example, many large item transports may have 12 or more sorting pocket modules, each module having four pockets, for a total of 48 or more pockets. In such a case, the number of sorting pocket modules add substantially to the length of the transport 102, increasing the time required for an operator to walk between two different widely separated parts of the transport 102.

The transport 102 is controlled by a transport controller 110 which may suitably be a programmed personal computer (PC) which controls the operation of the transport 102 and which receives inputs from an operator through a keyboard 112 and displays operator messages through a monitor 114. The transport 102 also includes a transmitter interface 116 communicating with the transport controller 110, receiving operator messages from the transport controller 110 and transmitting the messages through an antenna 117 to an operator display unit 118 carried or worn by the operator. Frequently, exceptions and problems, such as document jams, occur in the area of the pockets such as the pockets 108A–108H, and transmitting messages to the operator display unit 118 saves the operator from walking to the monitor to receive an error message and then returning to the area of the pockets 108A-108H to deal with the problem.

Figure 2:
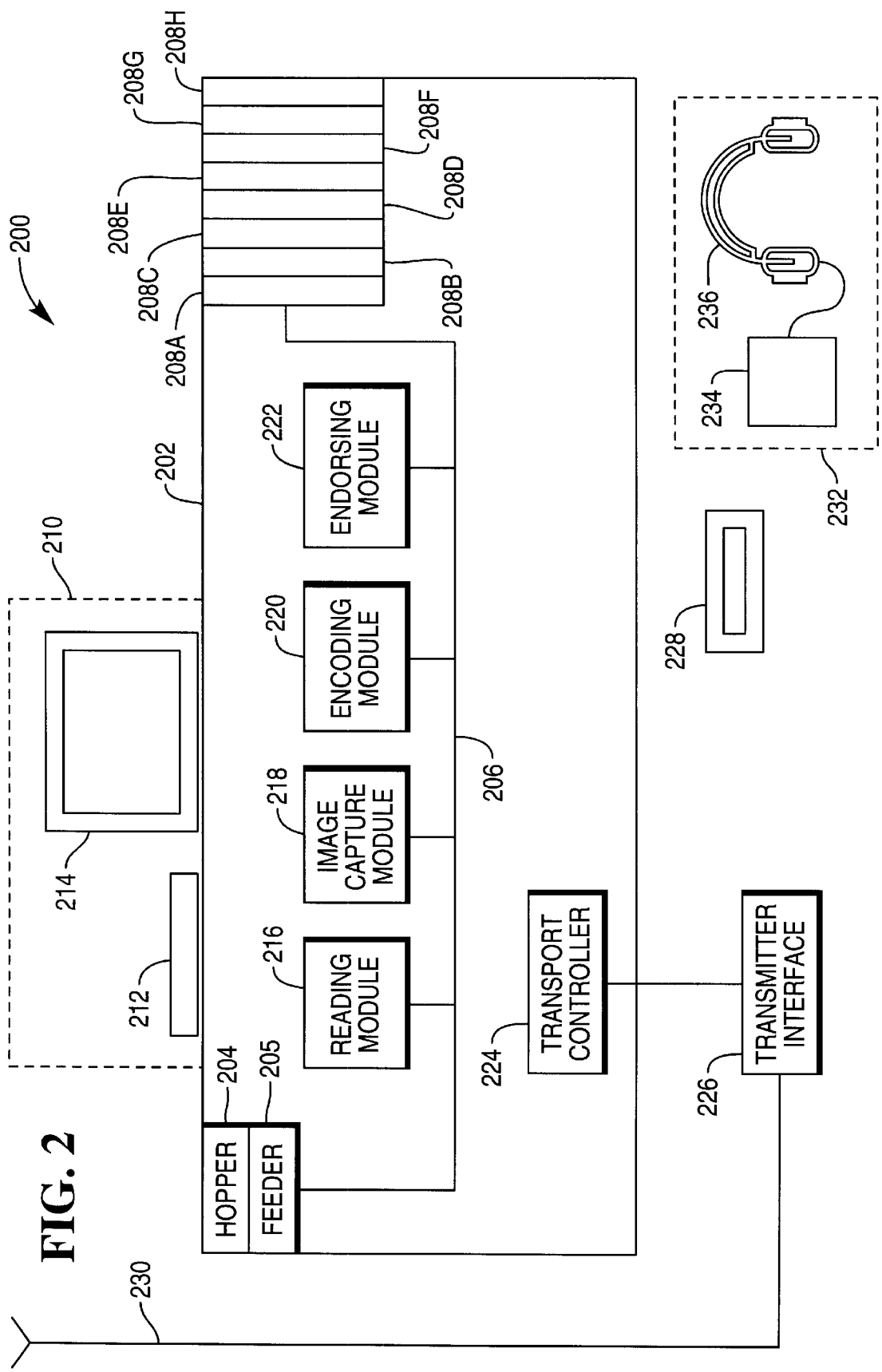
FIG. 2 illustrates functional details of a document processing system according to the present invention.

FIG. 2 is a detailed functional view of a document processing system 200 according to the present invention. The document processing system 200 includes an item processing transport 202 including a document hopper 204, document feeder 205, transport path 206 and sorting pockets 208A–H. The sorting pockets 208A–208H are shown here by way of example, and are discussed here as part of a single operational group, but it will be recognized that the transport 202 may include more or fewer pockets and that operational groupings of pockets will be determined by the needs of the processing operation being undertaken.

The transport 202 also includes an operator interface 210 including a keyboard 212 and monitor 214. The operator interface 210 may be used for entering data to be entered on a document, such as the amount of the document, and is also used to receive information about the status of the transport 202 and to enter commands directing operation of the transport 202. The transport 202 also includes a reading module 216, an image capture module 218, an encoding module 220 and an endorsing module 222. While the reading module 216, image capture module 218, encoding module 220 and endorsing module 222 are shown here by way of example, it is also possible for a transport such as the transport 202 to include additional modules, for example an ultraviolet snippet module for use in detecting security features appearing in ultraviolet ink, an endorsement capture module, a microverifier module, a microfilmer module, or any of a number of optional modules.

Operation of the transport 202 is controlled by a transport controller 224 which displays operator messages using the monitor 214 and receives operator inputs from the keyboard 212. The transport controller 224 also directs the operation of the document feeder 205, transport path 206, sorting pocket modules 208A-H and the modules 216, 218, 220 and 222, and receives and processes data generated by processing of documents. The transport controller 224 also communicates with a transmitter interface 226 in order to convey operator messages to an operator display unit 228 which receives operator messages transmitted via an antenna 230 connected to the transport controller 224. Typically, an item processing transport such as the transport 202 requires only a single operator, so that the transport controller 224 sends messages addressed to only one operator display unit 228. By addressing each message to the intended operator display unit 228 it is possible for the transport 202 to operate within radio range of other similar transports, each communicating to its own operator display unit, without misrouting of messages or other interference. The operator display unit 228 will display only messages including its address and will ignore messages addressed to other units.

Many transports, such as the transport 202, require little or no data entry via the keyboard 212. Instead, the necessary data is obtained from each document through image analysis. In such a case, the primary function of the operator is to correct problems in the operation of the transport. Because the transport 202 moves and sorts paper documents, the documents are subject to jams, misroutings and other problems which may cause the transport 202 to shut down until they can be corrected. Most problems occur in the vicinity of the sorting pockets 208A–H and an operator can be most productive by spending the bulk of his or her time in that area, moving to an appropriate one of the sorting pockets 208A–H when needed and correcting problems affecting that module. When the transport 202 experiences a problem, the affected module sends a message to the transport controller 224, which suspends operation of the transport 102, displays a message on the monitor 214 and uses the transmitter interface 226 to send an operator message to the operator display unit 228. The operator proceeds to the indicated area of the transport 202 and corrects the problem. The operator then preferably presses a button on the display unit 228, which sends a command to the transport controller 224 to resume operation. The operator may also alternatively press a pocket button or press an "Enter" key or another predetermined key on the keyboard 212 in order to resume operation.

It may also be desired to design the document processing system 200 to allow auditory notification of an operator. If such a design is desired, an operator audio message unit 232 may be employed as an alternative to, or in addition to, the display unit 228. The operator audio message unit 230 preferably comprises a receiver 234 and a headset 236. The transmitter interface 226 is modified to include a voice synthesizer and an audio transmitter, which will be described more fully below in connection with FIG. 7. When the transmitter interface 226 receives a signal from the transport controller 224 to send an operator message, the transmitter interface 226 uses the voice synthesizer to create a voice message constituting the desired operator message. The transmitter interface 226 uses the audio transmitter to transmit the desired voice message to the operator audio message unit 232.

The document processing system 200 provides significant savings of time and effort over prior art systems, which require the operator to walk to a display in order to read a message describing the problem and then walk back to the pocket area if, as is likely, the problem affects one of the pockets. Eliminating or substantially reducing the need to walk back and forth between the information display and the area where the problem exists significantly increases the productivity of the operator.

Figure 3:
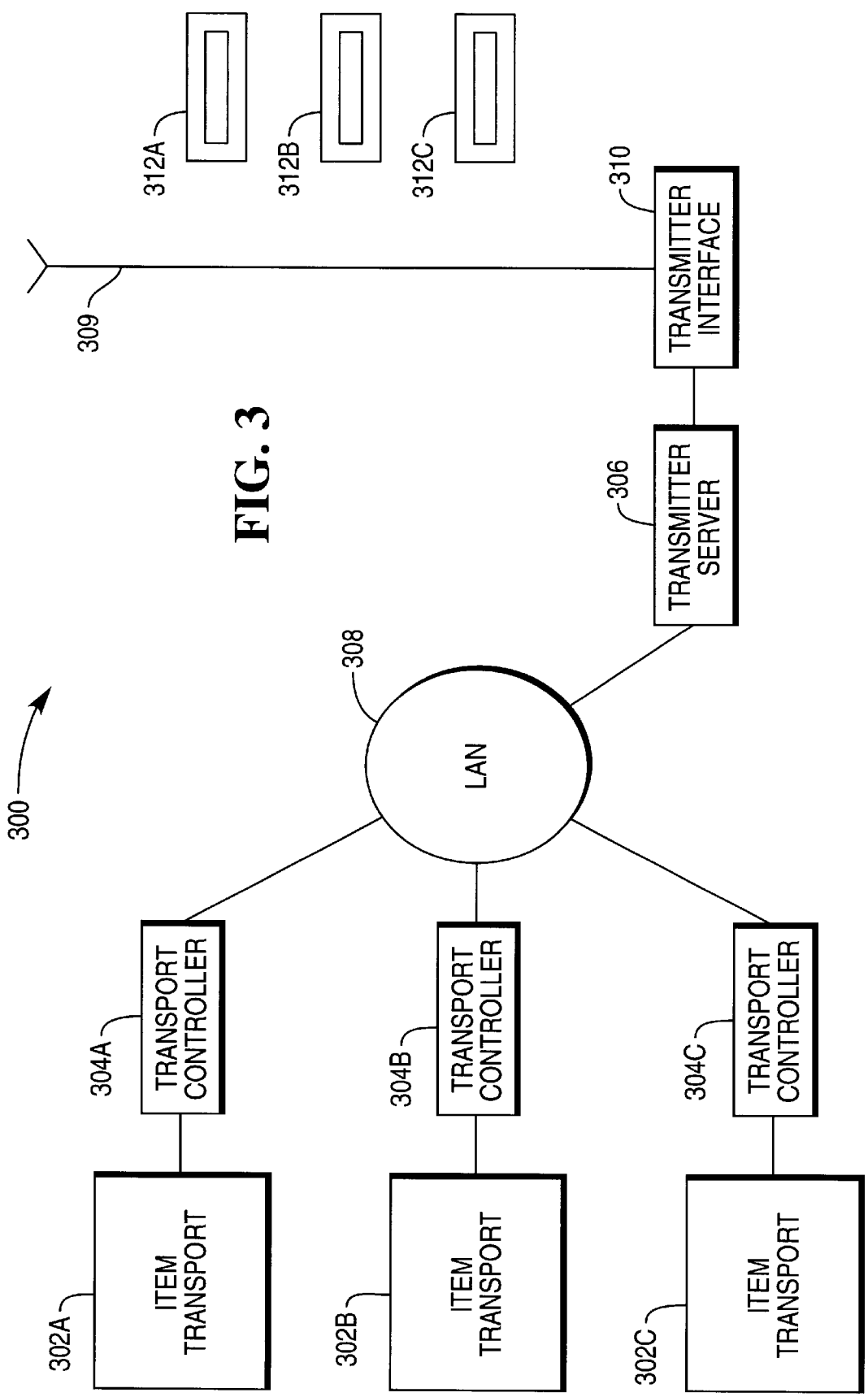
FIG. 3 illustrates a document processing system including multiple item transports according to the present invention.

If desired, a plurality of transports may share a single transmitter interface. FIG. 3 illustrates a document processing system 300 including transports 302A–302C, controlled by transport controllers 304A-304C, respectively. Each of the transport controllers 304A–304C is connected to a transmitter server 306 by a local area network 308. It will be recognized that the transmitter server 306 need not be exclusively dedicated to transmitting, but may be a multi-function server. The transmitter server 306 is in turn connected to a transmitter interface 310 and controls the operation of the transmitter interface 310 in response to commands from the transport controllers 304A–304C, also transferring data from the transmitter interface 310 to the transport controllers 304A–304C. Each of the transports 302A–302C is associated with one of the operator display units 312A–312C. When an exception occurs, for example affecting the transport 302A, the transport controller 304A prepares an operator message addressed to the operator display unit 312A. The transport controller 304A then passes the message to the transmitter server 306, which sends the message using the transmitter interface 308 and antenna 309. Because the message is addressed to the operator display unit 312A, the operator display units 312B and 312C will not be affected. A plurality of transports such as the transports 302A–302C are able to operate within radio range of one another and are able to share a transmitter interface, each transport being able to communicate with its own dedicated operator display unit without interfering with the operation of operator display units associated with the other transports.

Figure 4:
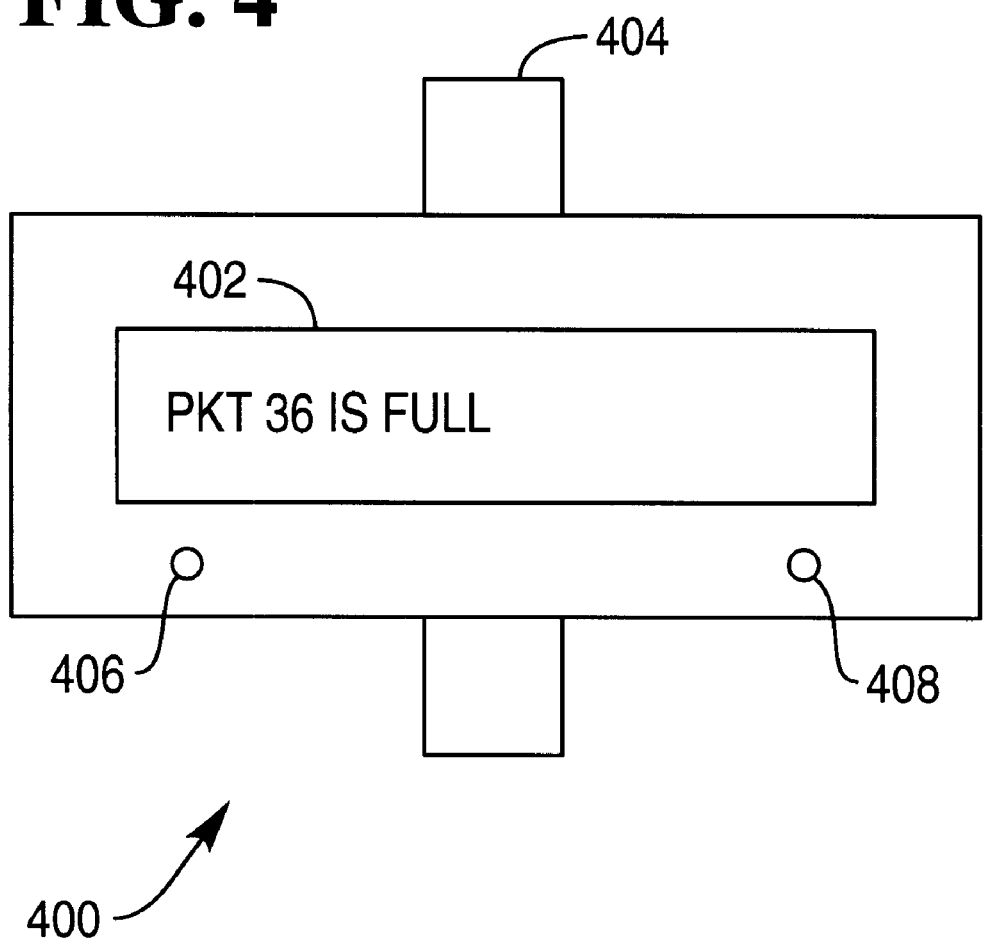
FIG. 4 illustrates an operator display unit according to the present invention.

FIG. 4 illustrates a front view of an operator display unit 400 according to the present invention. The transportable display unit 400 includes an LCD display 402, shown here as displaying an operator message "PKT 36 IS FULL," indicating to the operator that pocket 36 of the item transport sending the message is full. The unit 400 also includes a wrist strap 404, preferably including VELCRO, to allow secure attachment for wearing by the operator, as well as easy removal. First and second pushbuttons 406 and 408 are also shown and may be utilized as discussed in greater detail below.

Figure 5:
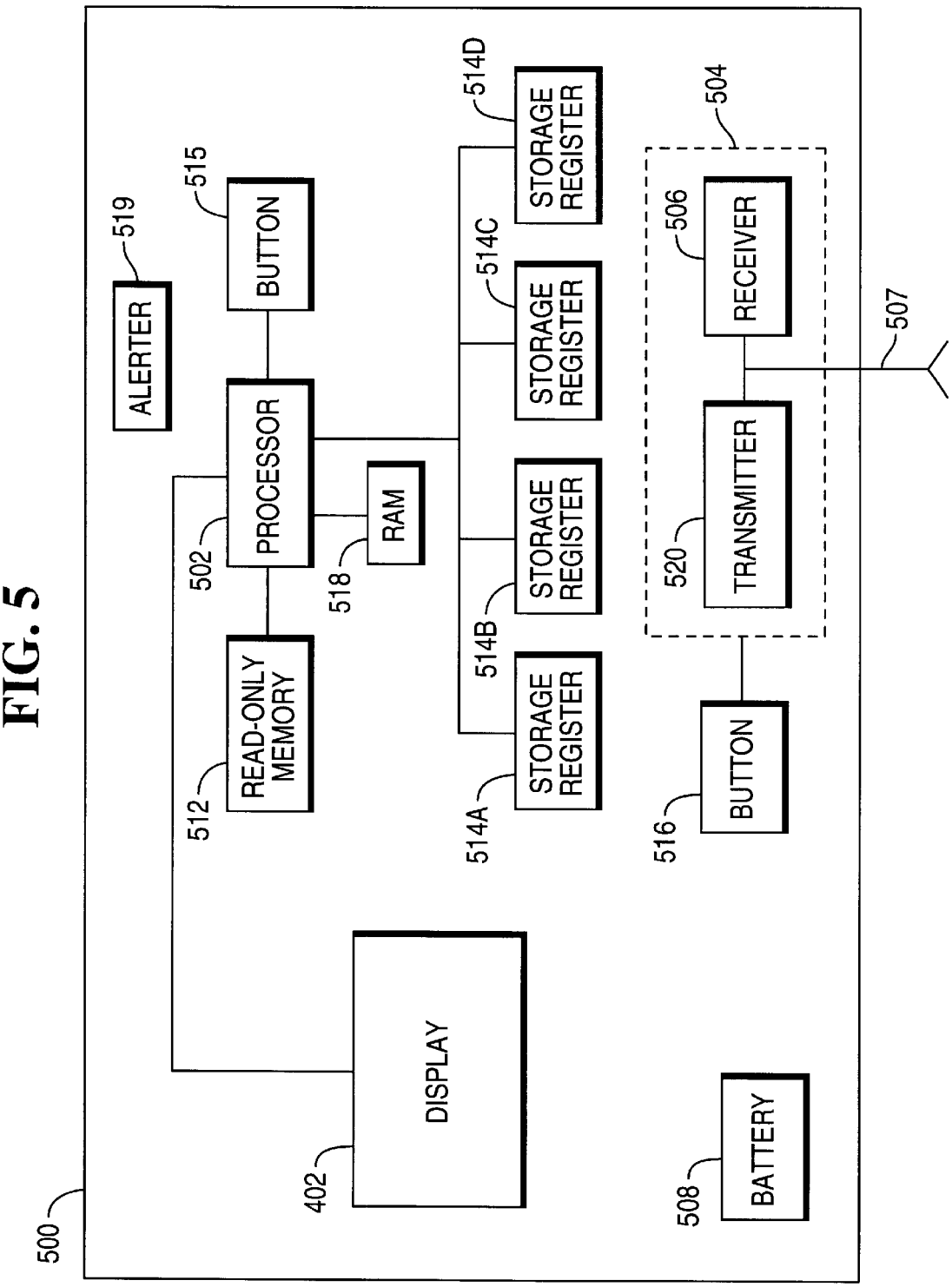
FIG. 5 illustrates additional details of an operator display unit according to the present invention.

FIG. 5 illustrates additional details of the operator display unit 400 according to the present invention. The display unit 400 includes a display unit processor 502, which may suitably be implemented as a digital signal processor, and a communications interface 504 for communicating with a transmitter interface such as the transmitter interface 226. The communications interface 504 includes a receiver 506 and an antenna 507 The antenna 507 is built into and preferably enclosed entirely within the display unit 400. The display unit 400 includes various other electronic components, including a battery 508, and the LCD display 402. The display unit 400 further includes read-only memory 512 for permanent storage of instructions and other data, as well as data registers 514A–514D for storing message information received from the transmitter interface 226. The data registers 514A–514D are preferably implemented using volatile memory.

The first pushbutton 406 allows an operator to direct the processor 502 to select the contents of any one of the registers 514A–514D for display. Repeated presses of the pushbutton 406 cycle between the different registers 514A–514D. In this way, the operator display unit 400 is able to receive messages longer than could otherwise be displayed on the LCD display 402, allowing the operator to read such messages by cycling through successive screens. A second pushbutton 408 is provided to allow the operator to signal the transport 202 to resume operation.

The display unit 400 also includes writable memory, shown here as RAM, 518 in addition to the volatile memory used for the data registers 514A–514D. The RAM 518 is used for short-term data storage in performing the normal operations of the operator display unit 400.

When the display unit 400 receives an operator message from the transmitter interface 226, the processor 502 displays the message using the LCD display 402. The processor 502 may also direct an audible signal using an alerter 519.

In order to reduce cost and complexity, the operator display unit 400 is preferably implemented as a passive device. In such an implementation, the display unit 400 does not independently transmit data to the transmitter interface 226, but sends signals only in response to status requests received from the transmitter interface 226. When the transport controller 224 directs the transmitter interface 226 to transmit an operator message to the display unit 400, the controller 224 preferably also directs the transmitter interface 226 to send repeated status requests by polling the display unit 400, in order to determine if the operator has pressed the second button 516 to command the transport controller 224 to resume operation of the transport. When the operator presses the second button 408, the display unit 400 employs a modulated backscatter approach to answer the status request, reflecting the transmission back to the transmitter interface 226. For further details of such an approach, see, for example, U.S. Pat. No. 5,640,683, assigned to the assignee of the present invention and incorporated herein by reference in its entirety. Upon receiving the reflected answer to the status request, the transmitter interface 226 sends a signal to the transport controller 224, which responds by proceeding to the next step in the exception handling operation, typically by examining the status of the transport 202 to determine if any exceptions remain and by resuming operation of the transport 202 or transmitting a follow-up message to the operator, as appropriate. Under normal circumstances, the transport controller 224 will send status requests only for a short time, during periods when operator intervention has been requested. When normal operation is resumed, the transport controller 224 stops sending status requests.

It is possible to implement the display unit 400 including a transmitter 520. If such an implementation is chosen, the display unit 500 can send unsolicited messages to the transport controller 524, providing greater flexibility in operation at the expense of added cost and complexity of the display unit 400.

The display unit 400 is preferably implemented by adapting an electronic shelf label, presently used in retail environments to receive radio frequency information messages comprising product description and price information and to respond to queries through the use of modulated backscatter. An electronic shelf label can be purchased from a suitable vendor and adapted for use as an operator display unit such as the display unit 400 simply by selecting the messages to be transmitted to the unit. Alternatively, a modified design may be developed to more closely adapt the display unit to the requirements of the item processing environment. For example, the data registers 514A–514D are preferably implemented as flash memory when the device is used as an electronic shelf label, because the contents of the registers change relatively infrequently. In an item processing environment, the contents of the registers 514A–514D change with much greater frequency, so that an institution might find it desirable to design an operator display unit 500 using RAM to implement the data registers 514A–514D.

Figure 6:
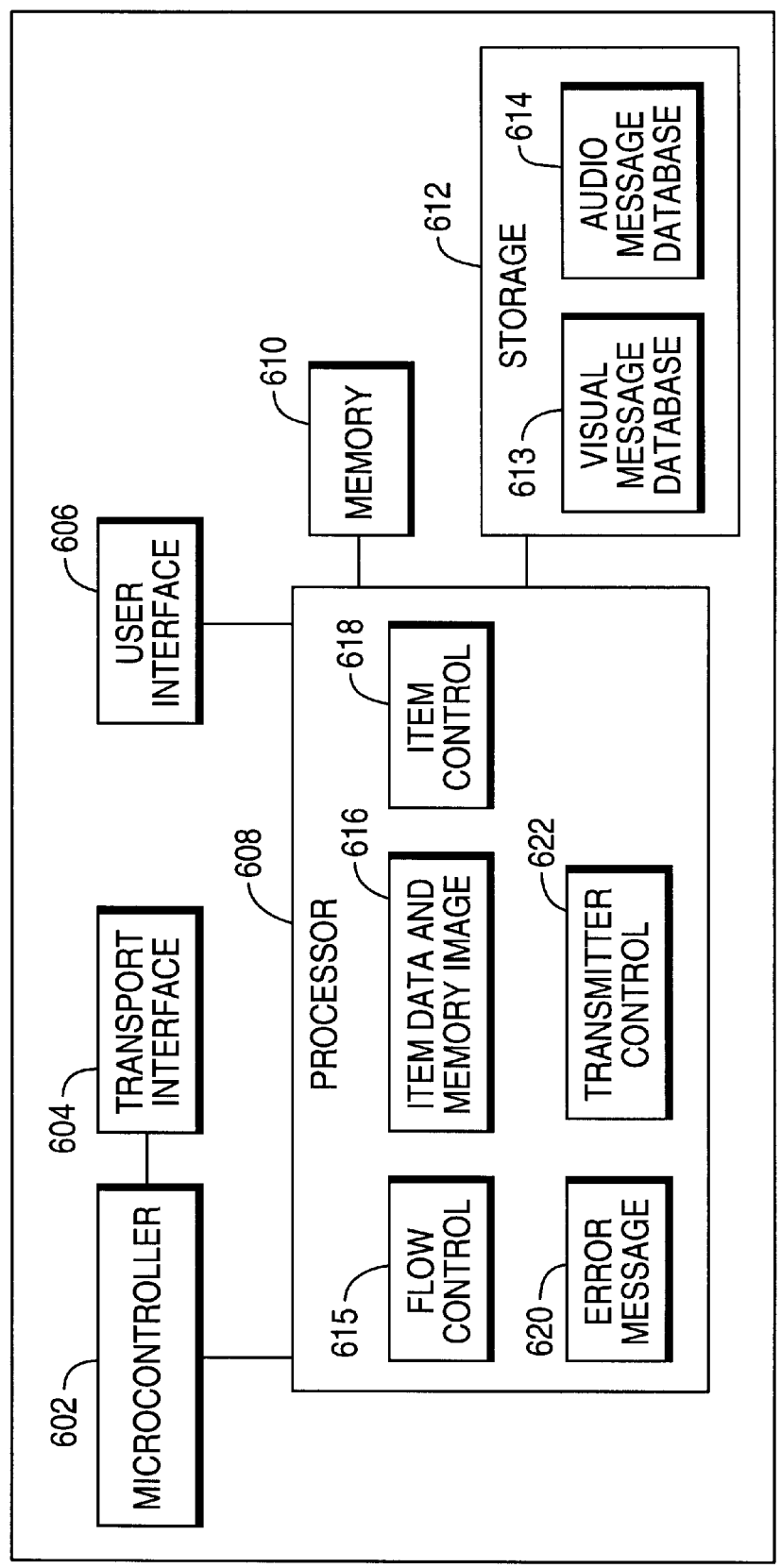
FIG. 6 illustrates functional details of a transport controller according to the present invention.

FIG. 6 provides a functional illustration of a transport controller which may be employed as the transport controller 224. The transport controller 224 includes a microcontroller 602 connected to a transport interface 604 and a user interface 606. The user interface 606 provides communication with a keyboard and monitor, such as the keyboard 212 and monitor 214 of FIG. 2, as well as a mouse or other desired user interface devices. The transport controller also includes a processor 608, memory 610 and extended database storage 612. A visual message database 613 and an audio message database 614 preferably reside in the storage 612. The processor 608 implements various functions used to control the transport operation and operator communication. The functions include a flow control function 615 for control of information and commands used by the transport controller. An item data and memory image function 616 are also implemented for reading and processing encoded item information as well as for capturing and storing item images. An item control function 618 is also implemented for directing transport of the items to be processed, as well as an error message function 620. When a function such as the item data and memory image function or the transport function experiences an exception, the affected function notifies the flow control function. The flow control function directs the item control function to suspend processing of items, and notifies the error message function that an error has occurred. The error message function 620 receives error information from the flow control function 615 and prepares error messages based on the error reports. Visual error messages are prepared by using the error information to look up appropriate messages in the visual message database 613 and audio error messages are prepared by using the error information to look up appropriate messages in the audio message database 614. The error message function 620 displays the error message locally and then provides the error messages to a transmitter control function 622, which formats the error messages into error message transmissions directed toward appropriate operator display units, and sends the error message transmissions to a transmitter control such as the transmitter interface 226.

Figure 7:
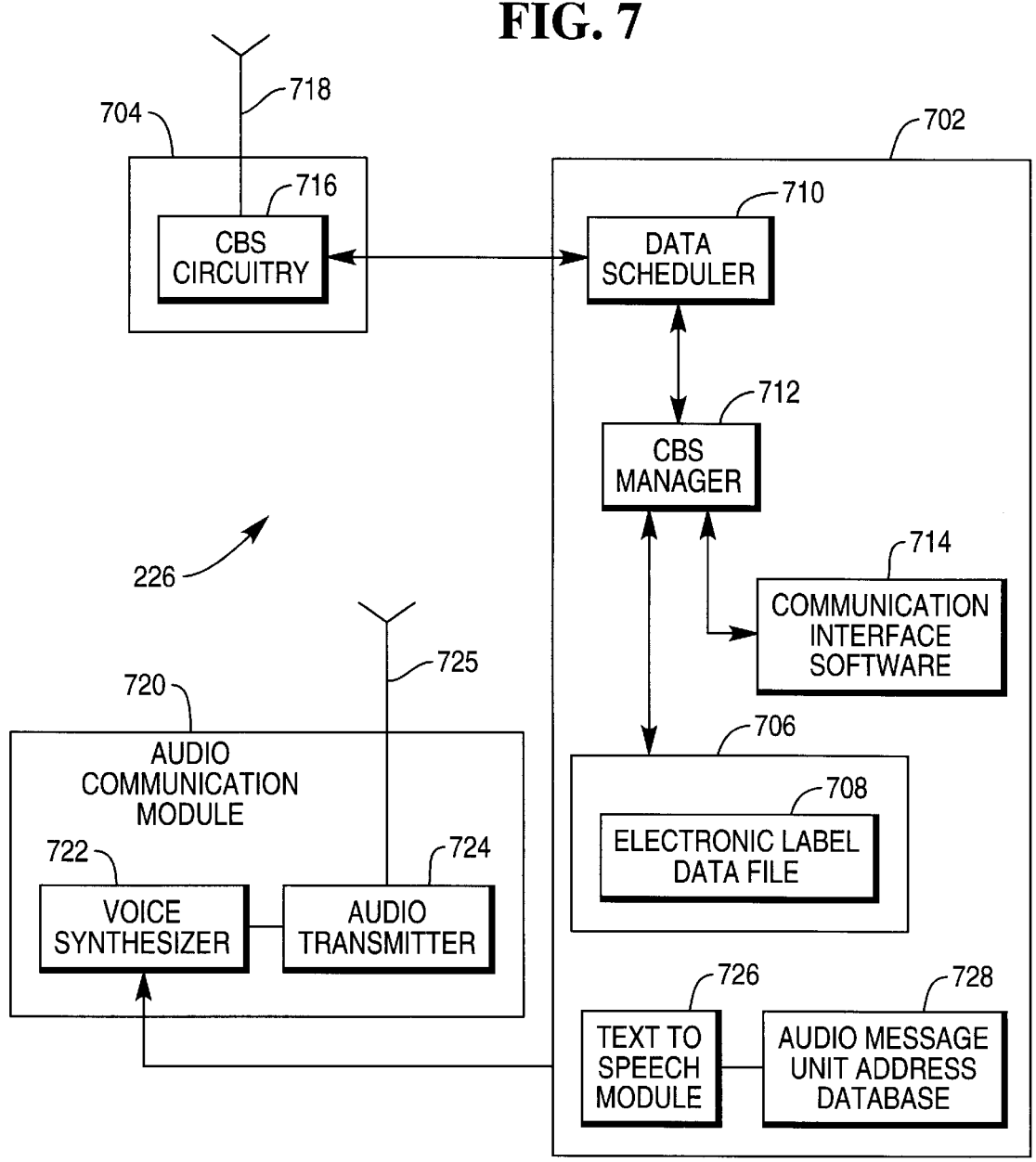
FIG. 7 illustrates a transmitter interface according to the present invention.

FIG. 7 illustrates additional details of the transmitter interface 226 of FIG. 2. The transmitter interface 226 is suitably adapted from an electronic price label communication device and includes a computer 702 and communication base station (CBS) 704. The computer 702 includes a storage medium 706, which may suitably be a disk drive, on which is stored an operator display unit data file 708 containing addresses of all display units such as the display unit 228, as well as data to be transmitted to each display unit. The computer 702 implements electronic display unit control software including a data scheduler 710 which manages transmission and reception of messages to and from each of the display units, as well as CBS management software 712, which directs the operations of the CBS 704 and which constructs messages to and interprets messages from the display units. The computer 702 also implements communication interface software 714, which manages the receipt of instructions from other elements of the document processing system and passes messages received from the display units to appropriate elements of the document processing system.

When the transmitter interface 226 receives an instruction to transmit messages to one or more display units, the computer 702 stores the messages in the operator display unit data file 708, each message being indexed to the correct display unit address. The data scheduler software 710 retrieves the messages and addresses from the data file 708 when one or more messages are scheduled to be sent, formats the messages and passes them to the CBS manager software 710. The CBS manager software 710 formats the messages for transmission by the CBS 704 and passes them to the CBS 704.

The CBS 704 translates the messages to a signal using CBS circuitry 716, and sends the signal using a CBS transmit antenna 718. The CBS transmit antenna 718 and CBS circuitry 716 are also adapted to receive signals from the operator display units in the form of modulated backscatter. When a signal is received from an operator display unit, the signal is converted to a message by the CBS circuitry 716, which passes the message to the data scheduler 710. The data scheduler 710 in turn passes the message to the CBS manager 712. The CBS manager software 710 passes the message to the communication interface software 714, which in turn passes the message to the transport controller 224. The computer 702 includes software adapted from management of electronic price labels and the CBS 704 is an adaptation of a CBS used to communicate with electronic price labels. In this way, the communication interface 226 can be constructed through the purchase and adaptation of readily available devices. Electronic price labels are used in the typical retail store environment in great numbers over a wide area, so that a number of CBS modules such as the CBS module 704 are employed to communicate with and control them. In a document processing environment, the number of electronic labels and the range over which they are to be used is likely to be smaller than in the typical retail store environment, so that it may often be possible or typical to employ only one CBS module such as the module 704. However, if desired, it is easy to employ multiple CBS modules such as the CBS module 704 to manage large numbers of electronic labels and to use the CBS manager software 710 to control the multiple CBS modules.

If a transmitter interface such as the transmitter interface 226 is desired to provide the capability to send audio messages to an operator audio communication, the interface 226 also includes an audio communication module 720 including a voice synthesizer 722 and an audio transmitter 724, as well as an audio transmission antenna 725. In such a case, the computer 702 preferably includes a text to speech module 722. When an audio message is to be sent to the operator using an audio message unit such as the unit 232, the transport controller 224 sends the message to the computer 702. The computer 702 uses the text to speech module 722 to produce an audio message. The computer 702 finds the address of the message unit to which the message unit is to be sent in an audio message unit address database 728, adds the address to the audio message, and sends the audio message to the audio communication module 720. The audio communication module 720 uses the speech synthesizer 722 to convert the audio message to speech, and transmits the message using the audio transmitter 724.

FIG. 8 illustrates a process 800 for exception handling for a single item transport, as in FIG. 2, or a group of item transports, as in FIG. 3, according to the present invention. At step 801, prior to operation of the item transport, an identification table is established associating each transport with an operator display unit. At step 802, the item transport suspends processing of items in response to an exception. The item transport may suitably be similar to the transport 202, or may be any of a number of item transport designs adapted to suspend operation in response to an exception and sense the nature of the exception. At step 804, an error message is constructed. The error message is preferably created by first retrieving data from an error database associating each exception with a specific error message and then adding data identifying the item transport affected and the operator display unit to receive the message, and formatting the message for transmission. At step 806, the message is wirelessly transmitted to an operator display unit, preferably a small, low cost wearable unit similar to the unit 400 of FIGS. 4 and 5. The message may be transmitted using a transmitter interface dedicated to a single item transport, or may alternatively be passed to a server controlling access to a shared transmitter interface. At step 808, the transport sends repeated status requests to the operator display unit to determine if the operator has signaled for the transport to resume operation.

At step 810, in response to a notification by the operator to resume operation, the transport examines sensors related to the exception to determine if the exception has been cleared. If the exception has been cleared, the process proceeds to step 850 and the transport sends a transmission clearing the error message on the operator display unit and resumes operation. If the exception has not been cleared, the process proceeds to step 812 and the transport examines a correction attempt count to determine if a predetermined number of allowable attempts to correct the exception has been made. If the maximum number of attempts has been made, the process proceeds to step 860 and the operator is instructed that the maximum number of correction attempts has been made and is instructed to proceed to a monitor for detailed instructions. The process then terminates at step 870. Returning now to step 812, if the correction attempt count has not been exceeded, the process proceeds to step 814. At step 814, the correction attempt count is incremented and a supplemental error message is transmitted, either giving additional details about the exception or simply alerting the operator that the exception has not been corrected. In response to a notification by the operator that the exception has been cleared, the process returns to step 810.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A document processing system, comprising:
    a document transport for processing financial documents, the document transport having a reading module;
    a transport controller for directing financial documents through a path which passes at least the reading module, the reading module reading information from the financial documents, the transport controller being operative to sense exceptions along the path and to generate operator messages in response to the exceptions;
    a transmitter interface for receiving operator messages from the transport controller and wirelessly transmitting the messages; and
    an operator display unit for wirelessly receiving operator display messages from the transmitter interface and visually displaying the messages for an operator.

2. The system of claim 1 wherein the operator display unit is a portable lightweight passive display unit.

3. The system of claim 2 wherein the operator display unit is adapted to be powered by small, low capacity batteries.

4. The system of claim 1 wherein the transmitter interface transmits the messages using omnidirectional RF communication.

5. The system of claim 4 wherein the transmitter interface is operative to receive signals from the operator display unit indicating an operator command to resume operation of the transport, the transmitter interface being further operative to transmit the signals to the transport controller.

6. The system of claim 5 wherein the transport controller directs the transmitter interface to send status requests to the operator display unit and wherein the signals are modulated backscatter reflected responses to the status requests.

7. The system of claim 6 and also including an operator audio message unit to allow the operator to receive audio messages and wherein the transmitter interface is operative to create and transmit the audio messages.

8. The system of claim 7 further comprising a server operative to receive error messages from the transport controller and similar transport controllers belonging to other transports, the server being operative to transmit messages from each transport controller to the transmitter interface, the system also including an operator display unit associated with each transport for receiving error messages related to the associated transport.

9. The system of claim 8 wherein the transport controller communicates with the server over a local area network.

10. A method of financial document processing exception handling comprising the steps of:
    suspending financial document processing upon detection of an exception;
    wirelessly transmitting a visual operator message describing the exception to an operator display unit; and
    receiving a wireless transmission message notifying that the exception has been cleared.

11. The method of claim 10 wherein the step of wirelessly transmitting an operator message comprises transmitting an omnidirectional RF signal containing the message.

12. The method of claim 11 wherein the step of suspending financial document processing is followed by the steps of looking up error data describing the exception and an identification number for an operator display unit associated with an item transport affected by the exception and wherein the step of looking up the identification number is followed by a step of formatting the message to include item transport identification and operator display unit identification numbers as well as a text message containing the error data.

13. The method of claim 12 wherein the step of transmitting the message includes passing the message to a server and from the server to a transmitter interface.

14. The method of claim 13 wherein the step of receiving the wireless transmission message that the exception has been cleared includes repeatedly transmitting status requests to the operator display unit until a status request is answered with the notification that the exception has been cleared.

15. The method of claim 14 wherein the status request is answered using modulated backscatter to provide a reflection of the status request.

16. The method of claim 15 wherein the step of receiving notification that the exception has been cleared is followed by the step of checking for the presence of exceptions and resuming processing if no exceptions exist.

17. The method of claim 16 and also including a step of transmitting an audio message to an operator audio message unit.

\* \* \* \* \*